United States Patent
Song et al.

(10) Patent No.: US 12,112,262 B2
(45) Date of Patent: Oct. 8, 2024

(54) REAL-TIME PREDICTION PROGRAM FOR CHANGE IN OCCUPANTS IN LARGE EXHIBITION HALL BASED ON DEEP LEARNING

(71) Applicant: Pusan National University Industry-University Cooperation Foundation, Busan (KR)

(72) Inventors: Giltae Song, Busan (KR); Seonghyeon Kim, Busan (KR)

(73) Assignee: PUSAN NATIONAL UNIVERSITY INDUSTRY—UNIVERSITY COOPERATION FOUNDATION, Busan (KR)

( * ) Notice: Subject to any disclaimer, the term of this patent is extended or adjusted under 35 U.S.C. 154(b) by 945 days.

(21) Appl. No.: 17/092,782

(22) Filed: Nov. 9, 2020

(65) Prior Publication Data

US 2021/0174166 A1  Jun. 10, 2021

(30) Foreign Application Priority Data

Dec. 10, 2019 (KR) .......................... 10-2019-0163500

(51) Int. Cl.
*G06N 3/08* (2023.01)
*G06F 18/10* (2023.01)
(Continued)

(52) U.S. Cl.
CPC .............. *G06N 3/08* (2013.01); *G06F 18/10* (2023.01); *G06F 18/214* (2023.01);
(Continued)

(58) Field of Classification Search
CPC ................................. G06N 3/08; G06N 3/044
See application file for complete search history.

(56) References Cited

U.S. PATENT DOCUMENTS

2017/0316262 A1* 11/2017 Holliday .............. G06V 40/103
2021/0080915 A1* 3/2021 Yan .......................... F24F 11/46

FOREIGN PATENT DOCUMENTS

KR   10-2015-0047989 A   5/2015

OTHER PUBLICATIONS

Saha H, Florita AR, Henze GP, Sarkar S. Occupancy sensing in buildings: A review of data analytics approaches. Energy and Buildings. Apr. 1, 2019;188:278-85. (Year: 2019).*

(Continued)

*Primary Examiner* — Oluwatosin Alabi
(74) *Attorney, Agent, or Firm* — McCormick, Paulding & Huber PLLC

(57) ABSTRACT

Disclosed are a method and apparatus for predicting a change in the occupants within a large exhibition hall in real time based on deep learning. A proposed method of predicting a change in the number of occupants within a space in real time includes dividing, into zones, a space where a number of occupants is to be predicted and pre-processing data related to a number of occupants within the space collected through simulations, generating the pre-processed data in a form of time-series data for deep learning, training a deep learning model for predicting a number of occupants in each divided zone using the generated time-series data, and predicting the number of occupants within the space by inputting, to the trained model, the data related to a number of occupants within the space collected in real time through socket communication with a server.

8 Claims, 6 Drawing Sheets

(51) Int. Cl.
G06F 18/21 (2023.01)
G06F 18/214 (2023.01)
G06N 3/044 (2023.01)
G06V 10/764 (2022.01)
G06V 10/774 (2022.01)
G06V 10/776 (2022.01)
G06V 10/82 (2022.01)
G06V 20/00 (2022.01)
G06V 20/52 (2022.01)

(52) U.S. Cl.
CPC ........... *G06F 18/217* (2023.01); *G06N 3/044* (2023.01); *G06V 10/764* (2022.01); *G06V 10/774* (2022.01); *G06V 10/776* (2022.01); *G06V 10/82* (2022.01); *G06V 20/36* (2022.01); *G06V 20/52* (2022.01)

(56) References Cited

OTHER PUBLICATIONS

Bergés M, Lange H, Gao J. Data-Driven operation of building systems: present challenges and future prospects. In Advanced Computing Strategies for Engineering: 25th EG-ICE International Workshop 2018, Lausanne, Switzerland, Jun. 10-13, 2018, Proceedings, Part II 25 2018 (pp. 23-52). (Year: 2018).*

Botalb A, Moinuddin M, Al-Saggaf UM, Ali SS. Contrasting convolutional neural network (CNN) with multi-layer perceptron (MLP) for big data analysis. In2018 International conference on intelligent and advanced system (ICIAS) Aug. 1, 20183 (pp. 1-5). IEEE. (Year: 2018).*

Ribeiro M, Grolinger K, ElYamany HF, Higashino WA, Capretz MA. Transfer learning with seasonal and trend adjustment for cross-building energy forecasting. Energy and Buildings. Apr. 15, 2018;165:352-63. (Year: 2018).*

Zhang K, Liu Z, Zheng L. Short-term prediction of passenger demand in multi-zone level: Temporal convolutional neural network with multi-task learning. IEEE transactions on intelligent transportation systems. Apr. 14, 2019;21(4):1480-90. (Year: 2019).*

Hashemi M. Enlarging smaller images before inputting into convolutional neural network: zero-padding vs. interpolation. Journal of Big Data. Dec. 2019;6(1):1-3. (Year: 2019).*

Jeon HS, Kum DS, Jeong WY. Traffic scene prediction via deep learning: Introduction of multi-channel occupancy grid map as a scene representation. In2018 IEEE Intelligent Vehicles Symposium (IV) Jun. 26, 2018 (pp. 1496-1501). IEEE. (Year: 2018).*

Kim S, Kang S, Ryu KR, Song G. Real-time occupancy prediction in a large exhibition hall using deep learning approach. Energy and Buildings. Sep. 15, 2019;199:216-22. (Year: 2019).*

Yang S, Ma W, Pi X, Qian S. A deep learning approach to real-time parking occupancy prediction in transportation networks incorporating multiple spatio-temporal data sources. Transportation Research Part C: Emerging Technologies. Oct. 1, 2019;107:248-65. (Year: 2019).*

Basheer Qolomany et al., "Role of Deep LSTM Neural Networks And Wi-Fi Networks in Support of Occupancy Prediction in Smart Buildings," The 15th IEEE International Conference on Smart City (SmartCity 2017), Bangkok, Thailand, Dec. 18-20, 2017.

Jordan Yeomans et al., "Simulating Time-Series Data for Improved Deep Neural Network Performance," IEEE, vol. 7, 2019, Sep. 12, 2019.

Kim et al., "Real-time occupancy prediction in a large exhibition hall using deep learning approach," ScienceDirect, vol. 199, Sep. 15, 2019, pp. 216-222.

* cited by examiner

FIG. 3

REAL-TIME PREDICTION PROGRAM FOR CHANGE IN OCCUPANTS IN LARGE EXHIBITION HALL BASED ON DEEP LEARNING

CROSS REFERENCE TO RELATED APPLICATION

This application claims priority under 35 U.S.C. § 119 to Korean Patent Application No. 10-2019-0163500 filed on 10 Dec. 2019, which is incorporated herein by reference in its entirety.

BACKGROUND OF THE INVENTION

1. Technical Field

The present disclosure relates to real-time prediction for a change in the occupants within a large exhibition hall based on deep learning. This work was supported by Institute of Information & Communications Technology Planning & Evaluation (IITP) under the Artificial Intelligence Convergence Innovation Human Resources Development (IITP-2024-RS-2023-00254177) grant funded by the Korea government (MSIT).

2. Description of the Related Art

An intelligence control system for optimizing energy efficiency of the air-conditioning technology has long been researched by targeting a common living space and a commercial building, but a large exhibition hall in which several thousands of people or more irregularly stay has been excluded from a research target. Energy efficiency of heating and cooling in an indoor space needs to be improved if the number of occupants can be previously predicted because the heating and cooling are related to the number of occupants within the indoor space. The existing effective method of predicting occupants by targeting a living space and a commercial building has been researched. First, a behavior of a resident is detected using various sensors, such as a passive infrared (PIR) sensor and a CO2 sensor, and occupants are predicted using a bidden Markov model (HMM) based on the detected data. A prediction method based on the HMM uses a physically divided space as a state space using the number of occupants as a state variable of the HMM. In the case of a large exhibition hall, prediction using the HMM is impossible because the number of occupants is greatly changed and the space is not physically divided.

SUMMARY OF THE INVENTION

Embodiments may provide a method and apparatus for predicting the number of occupants within a large exhibition hall whose space is not physically divided and in which the number of occupants is greatly changed, in real time, based on a deep learning technology.

In an aspect, a proposed method of predicting a change in the number of occupants within a space in real time includes dividing, into zones, a space where the number of occupants is to be predicted and pre-processing data related to the number of occupants within the space collected through simulations, generating the pre-processed data in the form of time-series data for deep learning, training a deep learning model for predicting the number of occupants in each divided zone using the generated time-series data, and predicting the number of occupants within the space by inputting, to the trained model, the data related to the number of occupants within the space collected in real time through socket communication with a server.

Dividing, into zones, a space where the number of occupants is to be predicted and pre-processing data related to the number of occupants within the space collected through simulations includes measuring a share of visitors to each zone using image sensors and counting devices installed at given intervals, and reinforcing the data through simulations in order to train the deep learning model.

The share of the visitors to each divided zone is measured for a predetermined time interval and a predetermined time. All of data sets are normalized within a range of 0 to 1 using a zero-padding scheme and minimum-maximum normalization.

Generating the pre-processed data in the form of time-series data for deep learning includes re-configuring the pre-processed data based on the deep learning model using a long-short term memory (LSTM).

Training a deep learning model for predicting the number of occupants in each divided zone using the generated time-series data includes using an individual model performing a share prediction model for receiving the time-series data based on an LSTM and outputting one occupancy number in one zone on a specific time. The prediction of a share is indicated as a weighted sum of shares for a plurality of divided zones on a current time.

In another aspect, a proposed apparatus for predicting a change in the number of occupants within a space in real time includes a pre-processor configured to pre-process data related to the number of occupants within a space collected through simulations, a time-series data generator configured to generate the pre-processed data in the form of time-series data for deep learning, a training unit configured to divide, into zones, a space where the number of occupants is to be predicted and to train a deep learning model for predicting the number of occupants in each divided zone using the generated time-series data, and a prediction unit configured to predict the number of occupants within the space by inputting, to the trained model, the data related to the number of occupants within the space collected in real time through socket communication with a server.

BRIEF DESCRIPTION OF THE DRAWINGS

FIG. 3 is a diagram illustrating temperature changes at different locations within a large exhibition hall according to embodiments of the present disclosure.

DETAILED DESCRIPTION

Hereinafter, embodiments of the present disclosure are described in detail with reference to the accompanying drawings.

Figure 1:
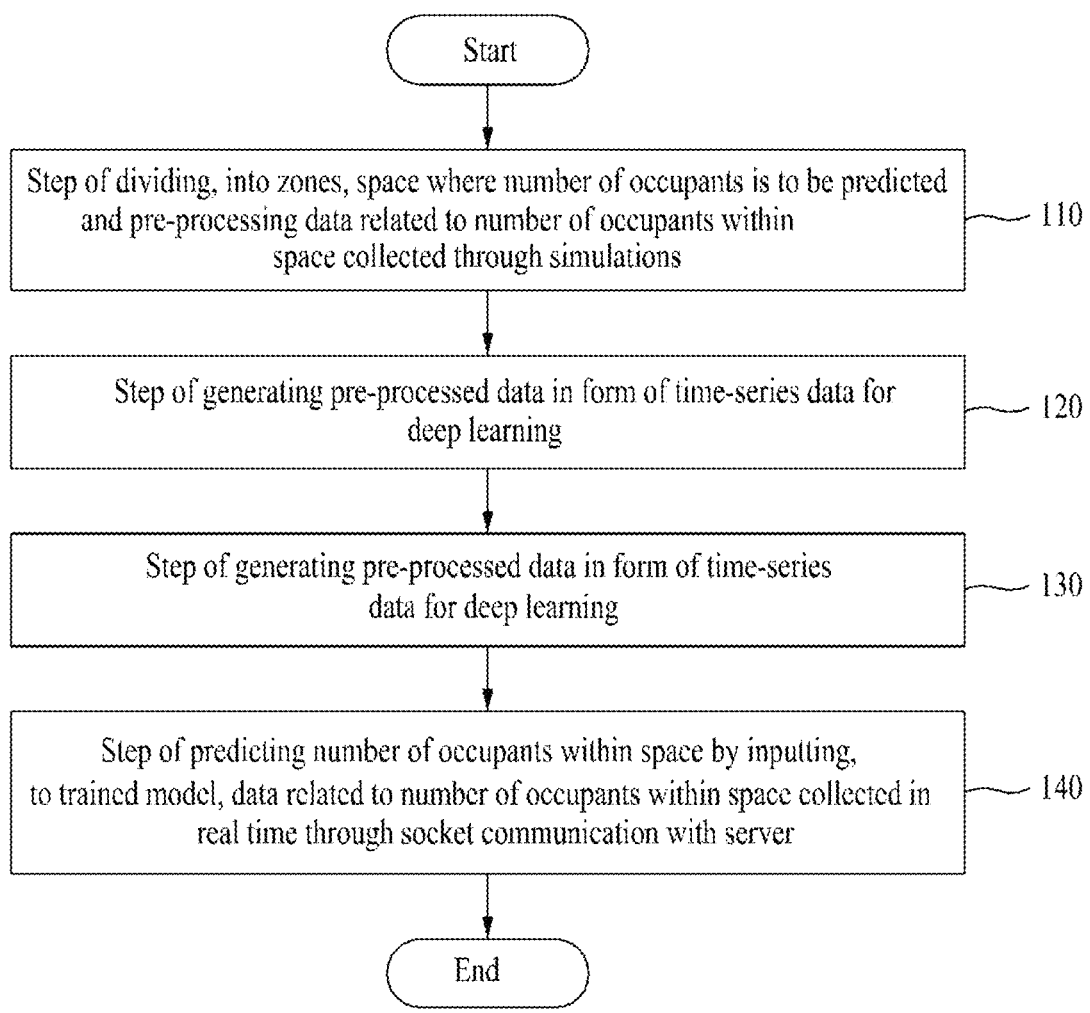
FIG. 1 is a flowchart for describing a real-time prediction method for a change in the occupants within a large exhibition hall based on deep learning according to embodiments of the present disclosure.

FIG. 1 is a flowchart for describing a real-time prediction method for a change in the occupants within a large exhibition hall based on deep learning according to embodiments of the present disclosure.

A proposed real-time prediction method for a change in the occupants within a large exhibition hall based on deep learning includes the step 110 of dividing, into zones, a space where the number of occupants is to be predicted and pre-processing data related to the number of occupants within the space collected through simulations, the step 120 of generating the pre-processed data in the form of time-series data for deep learning, the step 130 of training a deep learning model for predicting the number of occupants in each divided zone using the generated time-series data, and the step 140 of predicting the number of occupants within the space by inputting, to the trained model, the data related to the number of occupants within the space collected in real time through socket communication with a server.

According to an embodiment of the present disclosure, data pre-processing, model training, server communication, and prediction steps are performed. A large exhibition hall is divided into multiple virtual zones. The number of occupants in each zone is collected. Time-series data having a form suitable for deep learning is generated by extending data collected through simulations and performing a data pre-processing process. Thereafter, a deep learning model for predicting the number of occupants is trained for each divided zone. In this case, the model uses a recurrent neural network (RNN) suitable for time-series data and a long-short term memory (LSTM) cell having the long-term memory ability. Data related to the number of persons collected in real time through socket communication with a server is received, and the number of occupants in the large exhibition hall is predicted by inputting the data to the trained model. A predicted value is transmitted to the server again.

At step 110, a space where the number of occupants is to be predicted is divided into zones, and data related to the number of occupants within the space collected through simulations is pre-processed.

A share of visitors to each zone is measured using image sensors and counting devices installed at given intervals. Data is reinforced through simulations because the collection of actual data sets for generating time-series data is not sufficient to train a deep learning model. A share of visitors to each zone is measured for a predetermined time interval and a predetermined time. All data sets are normalized within a range of 0 to 1 using a zero-padding scheme and minimum-maximum normalization.

At step 120, the pre-processed data is generated in the form of time-series data for deep learning. In this case, the pre-processed data is re-configured based on a deep learning model using the LSTM.

At step 130, the deep learning model for predicting the number of occupants in each divided zone is trained using the generated time-series data. An individual model that performs a share prediction model for receiving time-series data based on the LSTM and outputting one occupancy number in one zone on a specific time is used. The prediction of the share is indicated as a weighted sum of shares for a plurality of divided zones on a current time.

At step 140, the number of occupants within the space is predicted by inputting, to the trained model, data related to the number of occupants within the space collected in real time through socket communication with the server.

Figure 2:
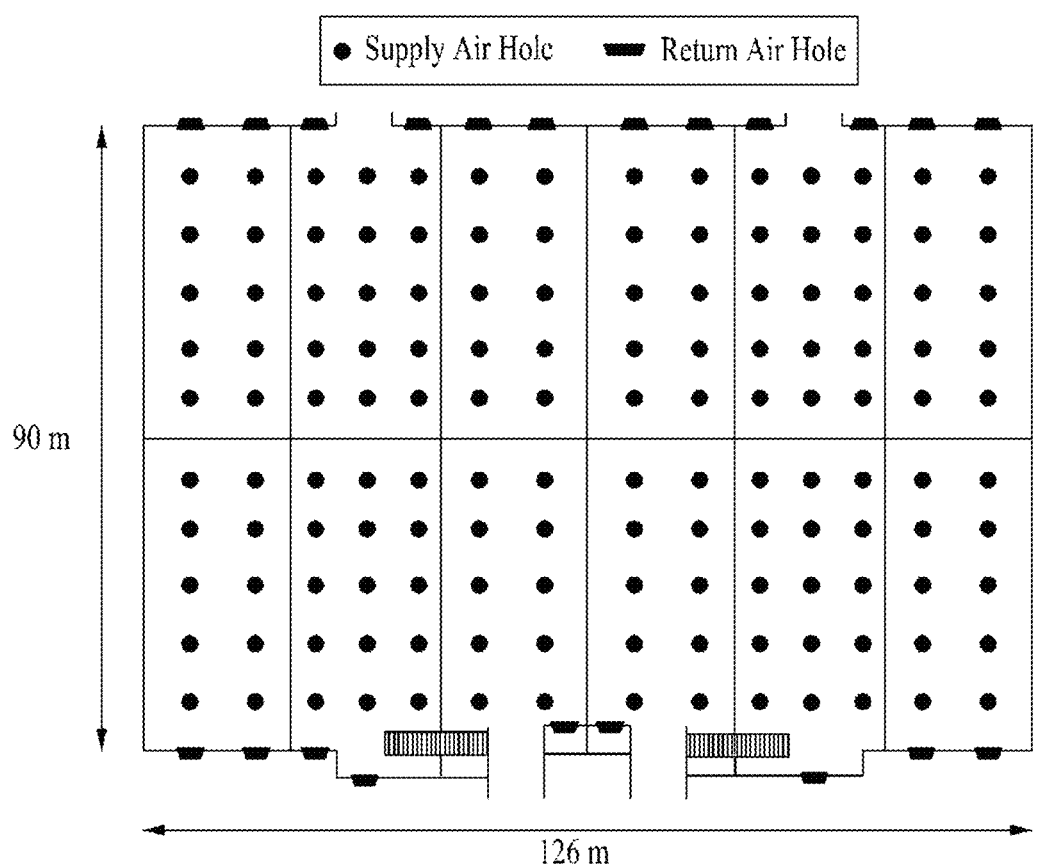
FIG. 2 is a diagram illustrating the layout of a large exhibition hall according to embodiments of the present disclosure.

FIG. 2 is a diagram illustrating the layout of a large exhibition hall according to embodiments of the present disclosure.

According to an embodiment of the present disclosure, data pre-processing, model training, server communication, and prediction steps are performed. A large exhibition hall is divided into multiple virtual zones. The number of occupants in each zone is collected. Time-series data having a form suitable for deep learning is generated by extending data collected through simulations and performing a data pre-processing process. Thereafter, a deep learning model for predicting the number of occupants is trained for each divided zone. In this case, the model uses an RNN suitable for time-series data and an LSTM cell having the long-term memory ability. Data related to the number of persons collected in real time through socket communication with a server is received, and the number of occupants in the large exhibition hall is predicted by inputting the data to the trained model. A predicted value is transmitted to the server again.

In the present disclosure, experiments were performed by targeting KINTEX's Second Exhibition Hall 7. Hall 7 was divided into 12 virtual zones, and the number of occupants within each zone was collected on a 15-minute basis. A model for predicting occupants within each of the 12 zones was separately designed and trained using data on which a pre-processing process was performed. Each of the 12 trained models received real-time data from the server, predicted occupants within each zone, and stored the predicted number of occupants in the server.

A total length, width and height of the hall were 126 m, 90 m, and 12 m, respectively. As indicated in FIG. 2, the hall is divided into 12 zones having the same size (in this case, the zones have not been practically separated physically). Each of the 12 zones was controlled by each air-conditioning system having 10 to 15 supply air holes in an average height of 7 m or more and one or two return air holes in a wall having an average height of 2 m. Although the number of air holes in the zones was different, all the air-conditioning systems had the same specifications. When the hall was designed, the hall may be used as a single space or two partitions separated by a temporary wall installed at the center. For this reason, the supply air holes are further concentrated toward the center of each half. Today, as the size of an exhibition hall increases, such a hall is rarely separated. Two entrances at the top wall of FIG. 2 are connected to a loading zone, but are closed so that a visitor can see an exhibition. Two entrances at the bottom wall of FIG. 2 are open to the exit. A visitor goes in and out each gate with an average error of 5%. Image sensors were installed in the hall at given intervals and measure the number of visitors, that is, a share of each zone.

The air-conditioning systems in the hall of FIG. 2 are not individually controlled. The air-conditioning systems are identically controlled with a set value fixed.

Figure 3:
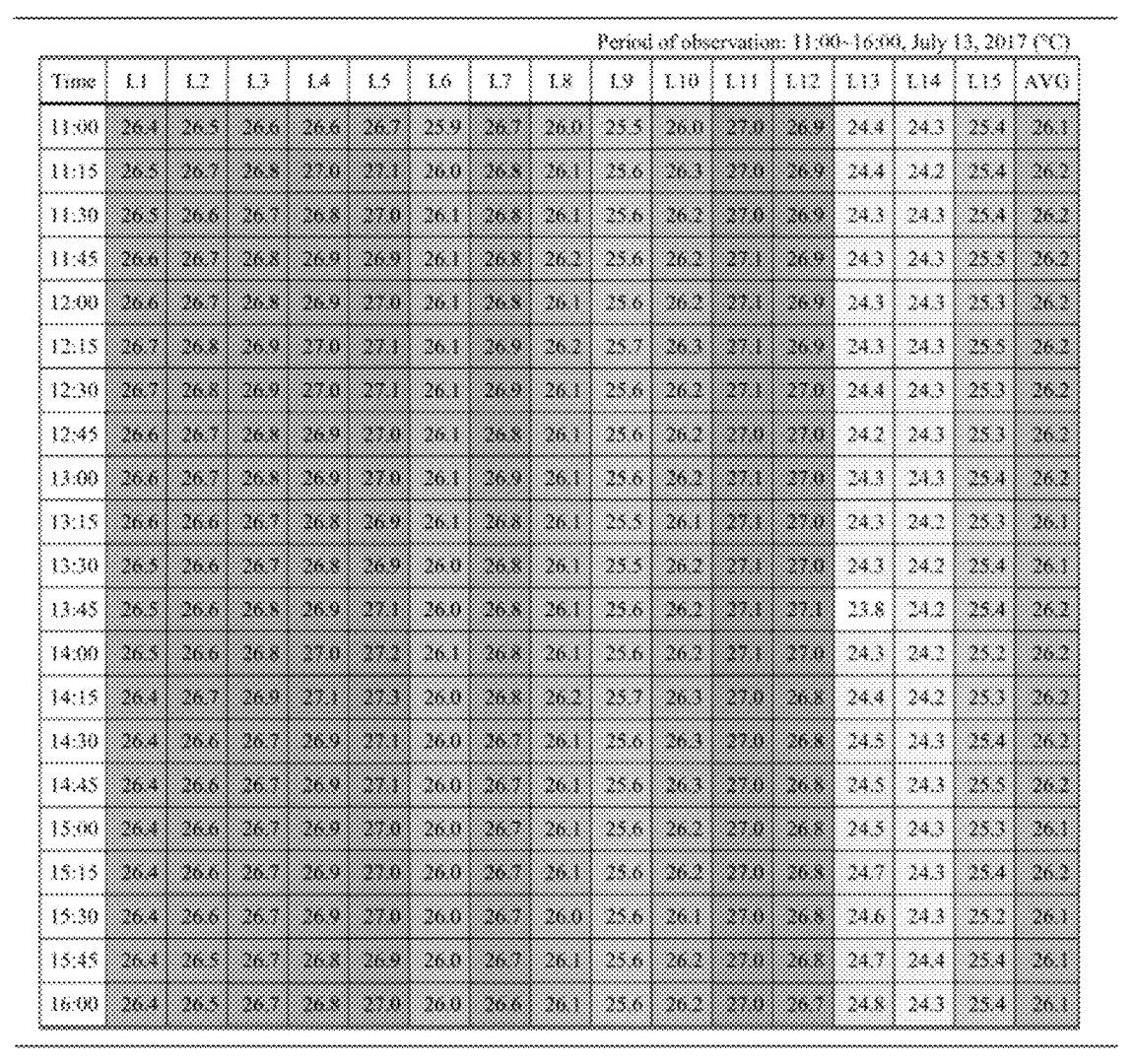

FIG. 3 is a diagram illustrating temperature changes at different locations within a large exhibition hall according to embodiments of the present disclosure.

FIG. 3 illustrates temperature changes over time at 15 different locations every 15 minutes on a summer day when an exhibition was held in the hall. At 2:15 pm, the highest temperature of 27.3° C. was observed at a location L5, while a temperature was the lowest (24.4° C.) at a location L14. A location L13 had the greatest difference in temperature of 1.0° C. on the day. A location having the smallest temperature difference of 0.1° C. was L11. Although an average temperature (i.e., the rightmost column in Table 3) of the hall was very constantly controlled over time, temperatures at other locations had significant deviations. A temperature difference may be easily estimated because distributions of heat loads attributable to shares of visitors to other locations are different. The existing system based on control of a fixed set value may constantly maintain an average of temperatures at locations regardless of a heat load. In contrast, finer control may be performed based on a comfort level having improved energy efficiency at all the locations.

Figure 4:
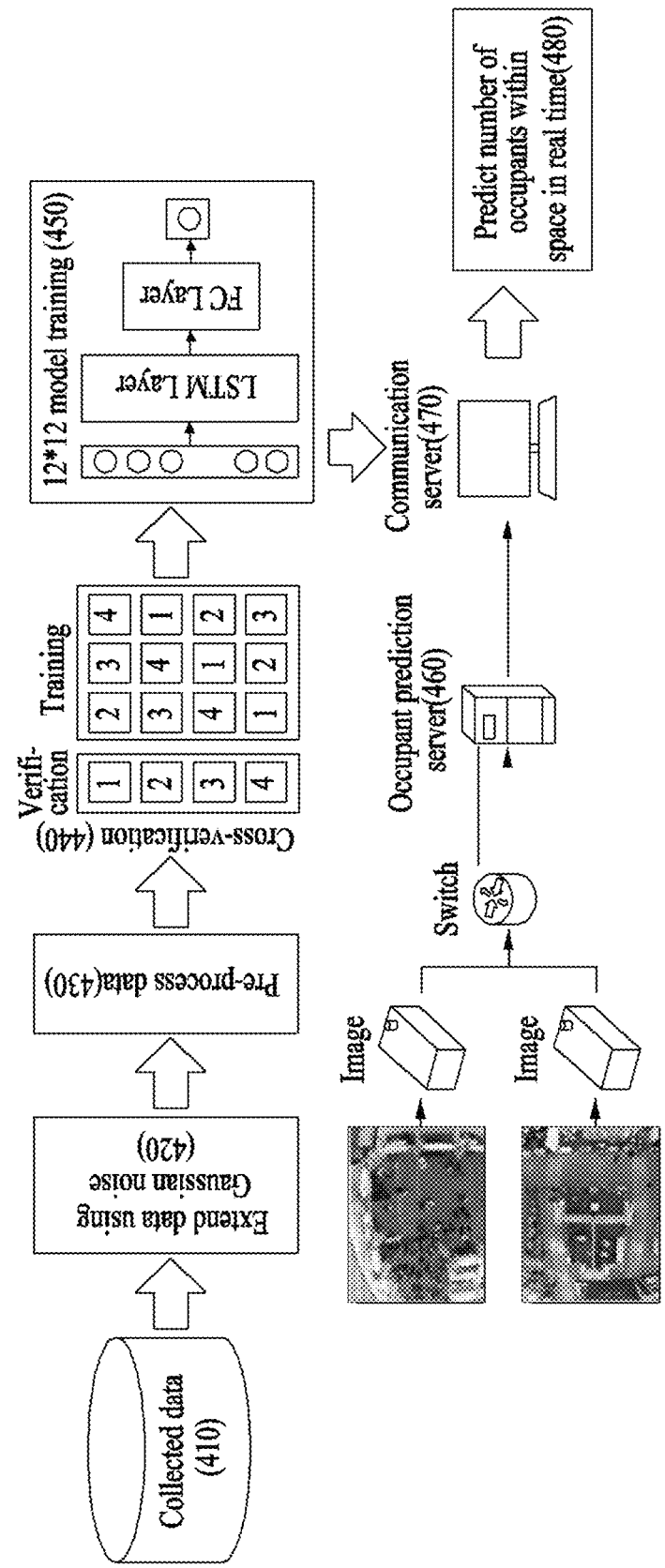
FIG. 4 is a diagram for describing the entire process of a share prediction model according to embodiments of the present disclosure.

FIG. 4 is a diagram for describing the entire process of a share prediction model according to embodiments of the present disclosure.

A target exhibition hall was conceptually divided into several zones. Occupancy information was collected in each zone every 15 minutes for 9 hours on each exhibition day using image sensors. The image sensor has 3.75 cm/pixel in VGA (640 480) optical resolution and 24 18 m in a point of view (POV). A total of 50 image sensors were installed in KINTEX Hall 7 at given intervals. Furthermore, 4 visitor counting devices using optical sensors were additionally installed at the exit of the exhibition hall. A share in each zone was measured using the image sensors and the counting devices. Share information was converted into the number of visitors to each zone and stored in an occupant prediction server 460.

The number of visitors to 4 different exhibitions (for 10 days) on June and July, 2018 was collected using the image sensors and the counting devices. A share of corresponding data in each of the zones of Hall 7 divided by 12 was collected from 9 a.m. to 6 p.m. every 15 minutes, and was indicted as an integer. The collected data 410 was reinforced through simulations because the collection of actual data sets for a time-series share was not sufficient to train the deep learning model. In order to produce a model through better generalization, a more change was added to training data sets through such data reinforcement. In the simulations, some time-series data of the actual data sets was sampled, and noise was applied to data sampled at all pieces of timing of all the 12 zones. The noise was generated based on a Gaussian distribution $N(0, \sigma^2)$ (420). In this case, $\sigma^2$ is a change in the share of the actual data set.

As illustrated in FIG. 4, a series of pre-processing tasks was applied (430) to constitute an input data set and used for deep learning.

All data was composed of data collected for 10 days and data for 300 days from the simulations based on the actual data sets. In order to verify the model, 5 cross-validations were used (440). 80% of the actual and simulation data was used as learning data, and the remaining data was used as test data sets.

Zero-padding has been known to have high prediction accuracy. Accordingly, in the case of virtual timing, 11 zeros were added at the start portion of daily share data, and 3 zeros were added to the end portion of the data. All of the data sets were normalized within a range of 0 to 1 using minimum-maximum normalization. The normalization data set was re-configured based on a deep learning model using the LSTM.

Share data in a time t is indicated as $H_t$ in a zone a day (refer to $H_t = [T'_{t-11}, T'_{t-10}, T'_{t-9}, \ldots, T'_t](t \geq 2)$). A daily data set is composed of $D_i = [H_{i,1}, H_{i,2}, H_{i,3}, \ldots, H_{i,39}]$. A total of the data sets is represented as P=concentrate($D_1$, $D_2$, \ldots, $D_N$). All of daily data is connected together to form [39×N, 12, 12]. In the equation, N is the number of daily data sets. Thereafter, ⅘ of all of the data sets was used as learning data, and the remaining data sets were used as test data. Training data sets are separated as training and verification sets at a ratio of 3:1 without overlapping.

The number of occupants within the space is predicted by inputting, to the trained model, data related to the number of occupants within the space collected in real time through socket communication between an occupant prediction server 460 and a communication server 470 (480).

Figure 5:
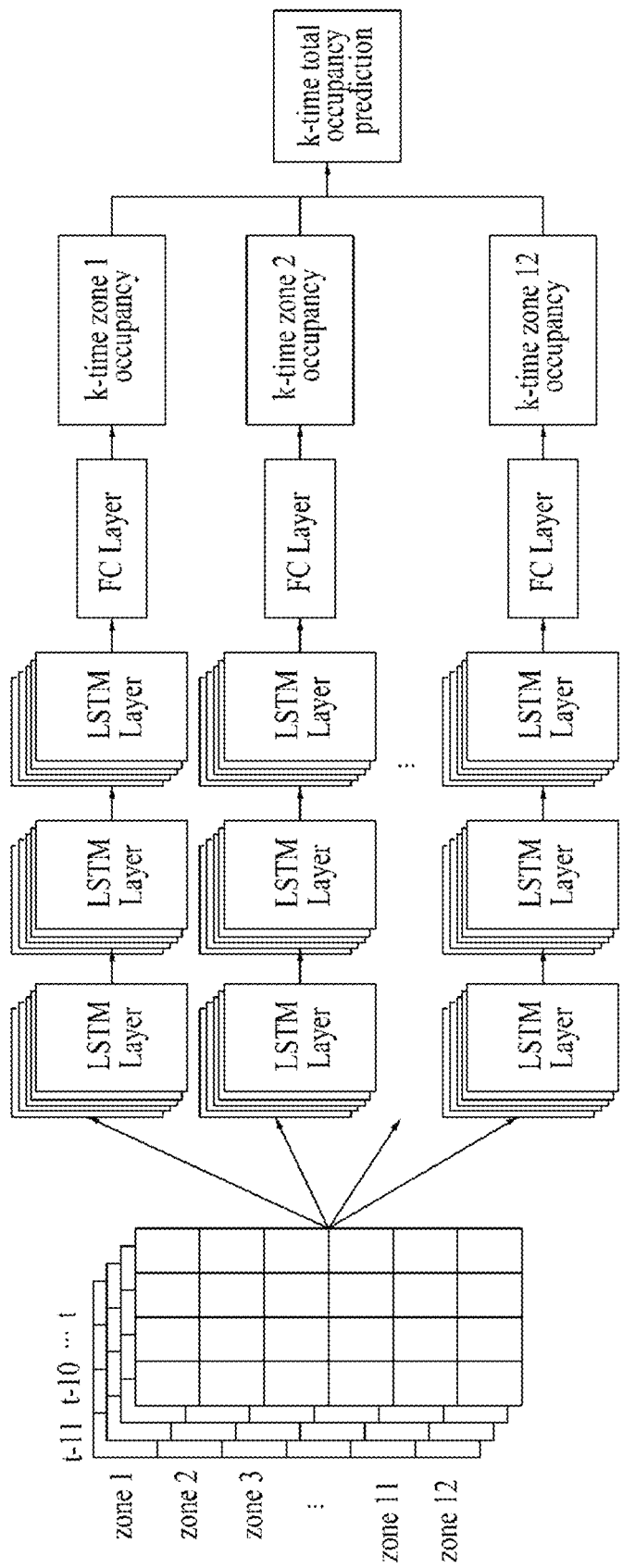
FIG. 5 illustrates architecture for predicting a share of each zone according to embodiments of the present disclosure.

FIG. 5 illustrates architecture for predicting a share of each zone according to embodiments of the present disclosure.

A proposed prediction method according to embodiments of the present disclosure is composed of 144 proposed occupancy prediction models. An individual model that performs a share prediction model for receiving time-series data based on the LSTM and outputting one occupancy number in one zone on a specific time was used. A total occupancy number for a specific time was calculated by adding the occupancy numbers in all the 12 zones.

When the 144 prediction models were trained, behaviors of occupants moving between the zones were considered. Thereafter, the prediction of shares of the 12 zones at given timing may be represented as a weighted sum of the shares of the 12 zones on a current time as follows:

$$C_i(t+1) = \sum_j W_{j,i} C_j(t)$$

In this case, i and j indicate zone numbers, $C_i(t+1)$ is the number of shares of the zone i at timing t+1, $C_j(t)$ indicates a share of the zone j at timing t, and $W_{j,i}$ indicates the weight of movements of visitors from the zone j to the zone i.

All the prediction models have the same architecture as that of FIG. 5. One prediction model inputs pre-processed data to an input layer, obtains a prediction value through 3 LSTM layers, and receives the output of multiple LSTM layers in order to predict one share value without an activation function.

Software was implemented in Tensorflow version 1.9.0 and tested in a workstation composed of Intel Xeon W-2195 2.30 GHz 8 GB GPU. The software was also executed in another environment. The software was executed in order to predict a share in KINTEX Hall 7 in an environment including Intel Core i7-6700 3.40 GHz CPU, 32 GB memory. The training speed of the learning model was set to 0.05, and an epoch thereof was set to 1000. Adam ottimizer was used for the optimization of the learning model. Furthermore, each model was trained using the following L2 loss function.

$$Loss = \sum_{i=0}^{n} (y_i - h(x_i))^2$$

In this case, $y_i$ is a target value, and $h(x_i)$ is a value predicted using the model.

A proposed prediction software pipeline was integrated into an energy management system. The energy management system collected a share from each of the zones in the large exhibition, and the share estimation server wrote the share in real time. The proposed prediction software used libraries "pymysql", "zmq" and "pickle python" in order to predict the share in real time through socket communication with the server.

Three criteria were used to compare performance of the occupancy prediction model with another model. The three criteria include a root mean square error (RMSE), a mean absolute error (MAE), and a mean absolute percentage error (MAPE).

Each of the measurement methods is defined as follows:

$$RMSE = \sqrt{\sum_{i=1}^{n} \frac{(T_i - P_i)^2}{n}}$$

$$MAE = \sum_{i=1}^{n} \frac{|P_i - T_i|}{n}$$

$$MAPE = \frac{100}{n} \sum_{i=1}^{n} \left|\frac{T_i - P_i}{T_i}\right| (\%)$$

In this case, $T_i$ is a target value from an actual data set, and $P_i$ is a predicted value. If $T_i$ is zero in the calculation of the MAPE, a zero division error may occur. Accordingly, a case where $T_i$ is 0 is excluded. In the collection of an actual data set and simulations, there is no case where the number of visitors in the zones of the exhibition hall is 0. This does not affect verification. While an exhibition is actually held, a case where a visitor or an exhibitor is not present in the zones of a large exhibition is rarely present.

Figure 6:
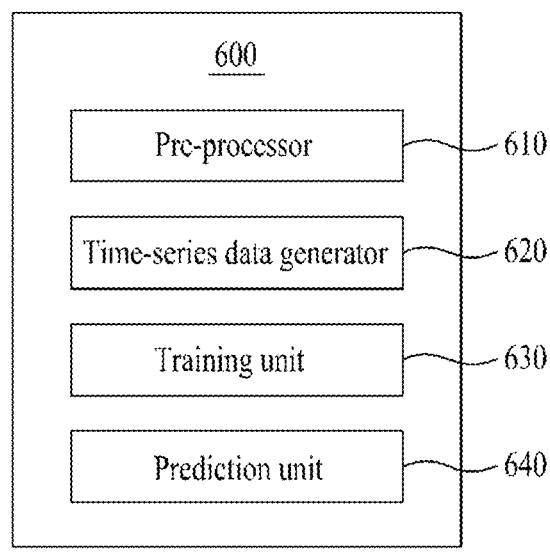
FIG. 6 is a diagram illustrating the configuration of an apparatus for predicting a change in the occupants within a large exhibition hall in real time based on deep learning according to embodiments of the present disclosure.

FIG. 6 is a diagram illustrating the configuration of an apparatus for predicting a change in the occupants within a large exhibition hall in real time based on deep learning according to embodiments of the present disclosure.

The proposed apparatus 600 for predicting a change in the occupants within a large exhibition hall in real time based on deep learning includes a pre-processor 610, a time-series data generator 620, a training unit 630, and a prediction unit 640.

The pre-processor 610, the time-series data generator 620, the training unit 630, and the prediction unit 640 may be configured in order to perform the steps 110 to 140 of FIG. 1.

The pre-processor 610 pre-processes data related to the number of occupants within a space collected through simulations. The pre-processor 610 measures a share of visitors to each of divided zones using image sensors and counting devices installed at given intervals, and reinforces data through simulations in order to train a deep learning model. The pre-processor 610 measures a share of visitors to each of the divided zones for a predetermined time interval and a predetermined time, and normalizes all of data sets within a range of 0 to 1 using a zero-padding scheme and minimum-maximum normalization.

The time-series data generator 620 generates the pre-processed data in the form of time-series data for deep learning. The time-series data generator 620 re-configures the pre-processed data based on the deep learning model using the LSTM.

The training unit 630 divides the space where the number of occupants is to be predicted, and trains the deep learning model for predicting the number of occupants in each divided zone using the generated time-series data. The training unit 630 uses an individual model that performs a share prediction model for receiving the time-series data based on the LSTM and outputting one occupancy number for one zone on a specific time. The prediction of the share is indicated as a weighted sum of shares for a plurality of zones divided in a current time.

The prediction unit 640 predicts the number of occupants within the space by inputting, to the trained model, data related to the number of occupants within the space collected in real time through socket communication with the server.

The aforementioned apparatus (or device) may be implemented as a hardware component, a software component and/or a combination of them. For example, the apparatus and elements described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing apparatus (or processor) may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, other processing configurations, such as a parallel processor, are also possible.

Software may include a computer program, code, an instruction or a combination of one or more of them and may configure a processor so that it operates as desired or may instruct processors independently or collectively. The software and/or data may be embodied in any type of a machine, component, physical device, virtual equipment, or computer storage medium or device so as to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure alone or in combination. The program instructions stored in the medium may be specially designed and constructed for the present disclosure, or may be known and available to those skilled in the field of computer software. Examples of the computer-readable storage medium include magnetic media such as a hard disk, a floppy disk and a magnetic tape, optical media such as a CD-ROM and a DVD, magneto-optical media such as a floptical disk, and hardware devices specially configured to store and execute program instructions such as a ROM, a RAM, and a flash memory. Examples of the program instructions include not only machine language code that is constructed by a compiler but also high-level language code that can be executed by a computer using an interpreter or the like.

According to embodiments of the present disclosure, the number of occupants within a large exhibition hall whose space has not been physically divided and in which the number of occupants is greatly changed can be predicted in real time based on a deep learning technology.

As described above, although the embodiments have been described in connection with the limited embodiments and drawings, those skilled in the art may modify and change the embodiments in various ways from the description. For example, proper results may be achieved although the above descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and equivalents of the claims fall within the scope of the claims.

What is claimed is:

1. A method of predicting a change in the number of occupants within a space in real time using a computer device, the method comprising:
dividing, by at least one processor of the computer device, into zones, a space where a number of occupants is to be predicted and pre-processing collected data related to the number of occupants within the space through simulations;
generating, by the at least one processor, the pre-processed data in a form of time-series data for deep learning;
training, by the at least one processor, a deep learning model for predicting a number of occupants in each of the divided zones using the generated time-series data; and
predicting, by the at least one processor, the number of occupants within the space by inputting, to the trained model, real time data related to the number of occupants within the space collected in real time through socket communication with a server;
wherein the training of the deep learning model comprises:
using an individual model configuring a share prediction model for receiving the time-series data based on an LSTM and outputting one occupancy number in one zone on a specific time; and
training the individual model using the pre-processed data with regard to each of the divided zones, respectively,
wherein a prediction of a share for the space comprising the divided zones is determined as a weighted sum of each share for each of the divided zones on a current time.

2. The method of claim 1, wherein the dividing comprises:
measuring a share of visitors to each zone using image sensors and counting devices installed at given intervals, and
reinforcing the collected data through simulations in order to train the deep learning model.

3. The method of claim 2, wherein:
the share of the visitors to each divided zone is measured for a predetermined time interval and a predetermined time, and
all of the time-series data sets are normalized within a range of 0 to 1 using a zero-padding scheme and minimum-maximum normalization.

4. The method of claim 1, wherein the generating the pre-processed data in a form of time-series data for deep learning comprises re-configuring the pre-processed data based on the deep learning model using a long-short term memory (LSTM).

5. A computer apparatus for predicting a change in a number of occupants within a space in real time, the apparatus comprising:
a pre-processor configured to pre-process collected data related to a number of occupants within a space through simulations;
a time-series data generator configured to generate the pre-processed data in a form of time-series data for deep learning;
a training unit configured to divide, into zones, a space where a number of occupants is to be predicted and to train a deep learning model for predicting a number of occupants in each of the divided zones using the generated time-series data; and
a prediction unit configured to predict the number of occupants within the space by inputting, to the trained model, real time data related to the number of occupants within the space collected in real time through socket communication with a server;
wherein the training unit is configured to:
use an individual model configuring a share prediction model for receiving the time-series data based on an LSTM and outputting one occupancy number in one zone on a specific time; and
train the individual model using the pre-processed data with regard to each of the divided zones, respectively;
wherein a prediction of a share for the space comprising the divided zones is determined as a weighted sum of each share for each of the divided zones on a current time.

6. The apparatus of claim 5, wherein the pre-processor is configured to:
measure a share of visitors to each zone using image sensors and counting devices installed at given intervals, and
reinforce the collected data through simulations in order to train the deep learning model.

7. The apparatus of claim 6, wherein:
the share of the visitors to each divided zone is measured for a predetermined time interval and a predetermined time, and
all of the time-series data sets are normalized within a range of 0 to 1 using a zero-padding scheme and minimum-maximum normalization.

8. The apparatus of claim 5, wherein the time-series data generator is configured to re-configure the pre-processed data based on the deep learning model using a long-short term memory (LSTM).

* * * * *